US010057196B2

(12) United States Patent
Zhang

(10) Patent No.: US 10,057,196 B2
(45) Date of Patent: Aug. 21, 2018

(54) INSTANT MESSAGING INTERACTION METHOD, SYSTEM, SERVER, AND STORAGE MEDIUM

(71) Applicant: TENCENT TECHNOLOGY (SHENZHEN) COMPANY LIMITED, Shenzhen, Guangdong (CN)

(72) Inventor: Wanying Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 547 days.

(21) Appl. No.: 14/644,189

(22) Filed: Mar. 10, 2015

(65) Prior Publication Data
US 2015/0188860 A1 Jul. 2, 2015

Related U.S. Application Data

(63) Continuation of application No. PCT/CN2013/083405, filed on Sep. 12, 2013.

(30) Foreign Application Priority Data

Sep. 21, 2012 (CN) .......................... 2012 1 0355112

(51) Int. Cl.
H04L 12/58 (2006.01)
H04L 29/06 (2006.01)
(Continued)

(52) U.S. Cl.
CPC .......... *H04L 51/046* (2013.01); *G06F 3/0484* (2013.01); *G06F 17/30867* (2013.01); *H04L 63/0428* (2013.01); *H04L 51/32* (2013.01)

(58) Field of Classification Search
CPC ............. G06F 17/30867; G06F 3/0484; G06F 3/04842; H04L 51/046; H04L 51/32; H04L 63/0428
See application file for complete search history.

(56) References Cited

U.S. PATENT DOCUMENTS

2012/0323991 A1* 12/2012 Wang ..................... H04L 51/32
709/203

FOREIGN PATENT DOCUMENTS

CN 1933398 A 3/2007
CN 101217515 A 7/2008
(Continued)

OTHER PUBLICATIONS

1st Office Action of counterpart Chinese Patent Application No. 201210355112.X dated Mar. 27, 2017.
(Continued)

Primary Examiner — Andrea Long
(74) Attorney, Agent, or Firm — Anova Law Group, PLLC

(57) ABSTRACT

The present disclosure provides an instant messaging interaction method, system, server, and storage medium. The method includes: receiving, by a client side, an answer character string corresponding to a particular question input by a user via a first account; sending, by the client side, the answer character string and corresponding user property information to a server; searching, by the server, the particular question and a target answer thereof according to the user property information, and matching and verifying, by the server, the answer character string with the target answer; and when the verification is successful, returning, by the server, a first notice to a client side for displaying, and scoring preset property of the first account based on a preset rule. The instant messaging interaction method, system, and server provided in the present disclosure stimulate the question-and-answer interaction between instant messaging users, which improves the effectiveness of the interaction.

9 Claims, 9 Drawing Sheets

(51) Int. Cl.
  *G06F 17/30*    (2006.01)
  *G06F 3/0484*   (2013.01)

(56) References Cited

FOREIGN PATENT DOCUMENTS

| CN | 102314447 A | 1/2012 |
| CN | 102347929 A | 2/2012 |
| CN | 102375927 A | 3/2012 |
| CN | 103138921 A | 6/2013 |

OTHER PUBLICATIONS

International Search Report of PCT Patent Application No. PCT/CN2013/083405 dated Dec. 12, 2013.

* cited by examiner

INSTANT MESSAGING INTERACTION METHOD, SYSTEM, SERVER, AND STORAGE MEDIUM

CROSS-REFERENCES TO RELATED APPLICATIONS

This application is a continuation of PCT Application No. PCT/CN2013/083405 filed on Sep. 12, 2013, which claims priority to Chinese patent application No. 201210355112.X filed on Sep. 21, 2012, the content of which are incorporated herein by reference in their entirety.

FIELD OF THE INVENTION

The present disclosure relates to instant messaging technologies, and more particularly, to an instant messaging interaction method, system, server, and storage medium.

BACKGROUND OF THE INVENTION

Network instant messaging tools have developed so much today to be accepted by most of internet users and become a necessary part in users' daily life. Instant messaging software is not only utilized in users' daily life, but also utilized in users' spare-time activities, providing instant and effective communication between a user and the person he or she wants to contact.

Inventors found that the existing technology has the following shortcoming: during the contact between a user and his or her friend, not only the communication based on plain text is required, but also an enriched interaction and communication way is required, however, the existing interaction and communication mode cannot meet the requirement for multi-level communication from the user and may affect the effectiveness of the communication in a certain degree.

SUMMARY OF THE INVENTION

In order to solve the problem in the existing technology that the effectiveness of the communication between instant messaging users is restricted, an instant messaging interaction method, system, server, and storage medium are respectively provided. The technical solutions are as follows.

In one aspect of the present disclosure, an instant messaging interaction method is provided, including:

receiving, by a client side, an answer character string corresponding to a particular question input by a user via a first account;

sending, by the client side, the answer character string and corresponding user property information to a server;

searching, by the server, the particular question and a target answer to the particular according to the user property information, and matching and verifying, by the server, the answer character string with the target answer; and when the verification is successful, returning, by the server, a first notice to the client side for displaying, and scoring preset property of the first account based on a preset rule.

In another aspect, an instant messaging system is provided, including:

an inputting module, configured to receive an answer character string corresponding to a particular question input by a user via a first account;

a sending module, configured to send the answer character string and corresponding user property information to a server;

a verifying module, configured to search the particular question and a target answer to the particular question according to the user property information, and match and verify the answer character string with the target answer; and a notifying and scoring module, configured to return a first notice to a client side for displaying and score preset property of the first account based a preset rule when the verification fails.

In still another aspect of the present disclosure, an instant messaging server is provided, including:

a receiving module, configured to receive an answer character string corresponding to a particular question and corresponding user property information sent from a first account;

a verifying module, configured to search the particular question and a target answer to the particular question according to the user property information, and match and verify the answer character string with the target answer; and a notifying and scoring module, configured to return a first notice to a client side for displaying when the verification is successful, and score preset property of the first account based on a preset rule.

Compared with the existing technology, the instant messaging interaction method, system, and server provided in the present disclosure stimulate the question-and-answer interaction between instant messaging users, which improves the effectiveness of the interaction.

BRIEF DESCRIPTION OF THE DRAWINGS

To clearly explain the technical solutions of the embodiments of the present invention, drawings that are required by the embodiments are briefly introduced. Apparently, the drawings described below are only some embodiments of the present invention. For those skilled in the art, other drawings according to these drawings can be obtained without creative efforts.

DETAILED DESCRIPTION OF THE INVENTION

The technical solutions provided in embodiments of the present invention are clearly described in detail below with reference to the accompanying drawings. Obviously, the embodiments described herein are only some embodiments rather than all of the embodiments. Based on the embodiments of the present invention, other embodiments obtained by one having ordinary skill in the art without creative work, are included in the protection scope of the present invention.

The embodiments of the present invention are given in more detail below with reference to the accompanying drawings.

Embodiment 1

Figure 1:
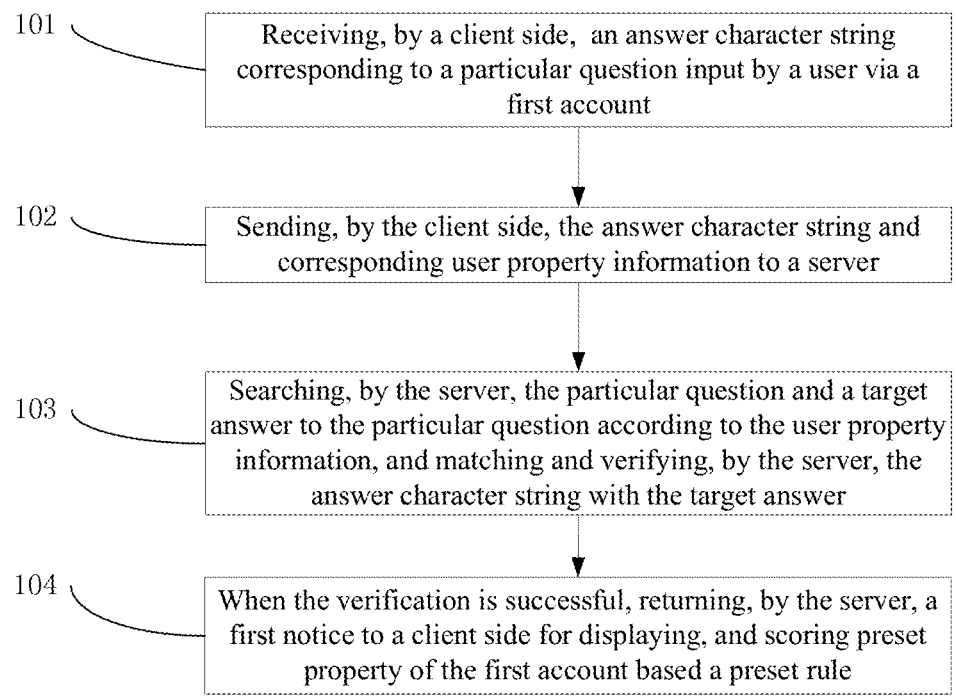
FIG. 1 is a flow chart illustrating an instant messaging interaction method in accordance with a first embodiment of the present disclosure.

The present disclosure provides an instant messaging interaction method in accordance with a first embodiment, as shown in FIG. 1, the method includes:

step 101, receiving, by a client side, an answer character string corresponding to a particular question input by a user via a first account;

step 102, sending, by the client side, the answer character string and corresponding user property information to a server;

step 103, searching, by the server, the particular question and a target answer to the particular question according to the user property information, and matching and verifying, by the server, the answer character string with the target answer; and step 104, when the verification is successful, returning, by the server, a first notice to a client side for displaying, and scoring preset property of the first account based a preset rule.

The instant messaging interaction method provided in the present disclosure stimulates the question-and-answer interaction between instant messaging users, which improves the effectiveness of the interaction.

Embodiment 2

Figure 2:
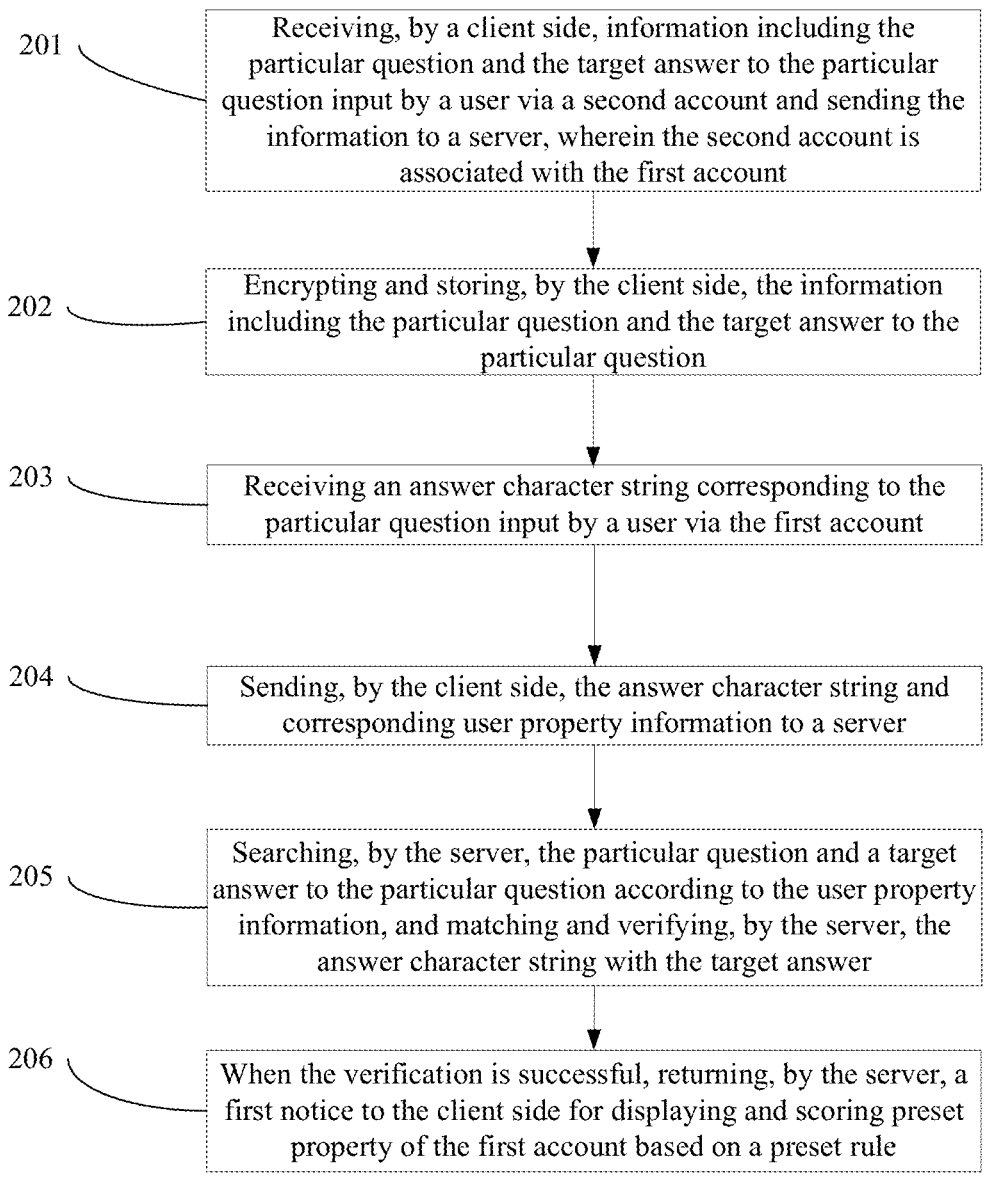
FIG. 2 is a flow chart illustrating an instant messaging interaction method in accordance with a second embodiment of the present disclosure.

Based on the method of the first embodiment, the present disclosure further provides an instant messaging interaction method in accordance with a second embodiment, as shown in FIG. 2, the method of the second embodiment includes steps as follows.

Step 201, receiving information, by a client side, including the particular question and the target answer to the particular question input by a user via a second account and sending the information to a server, wherein the second account is associated with the first account.

Figure 3:
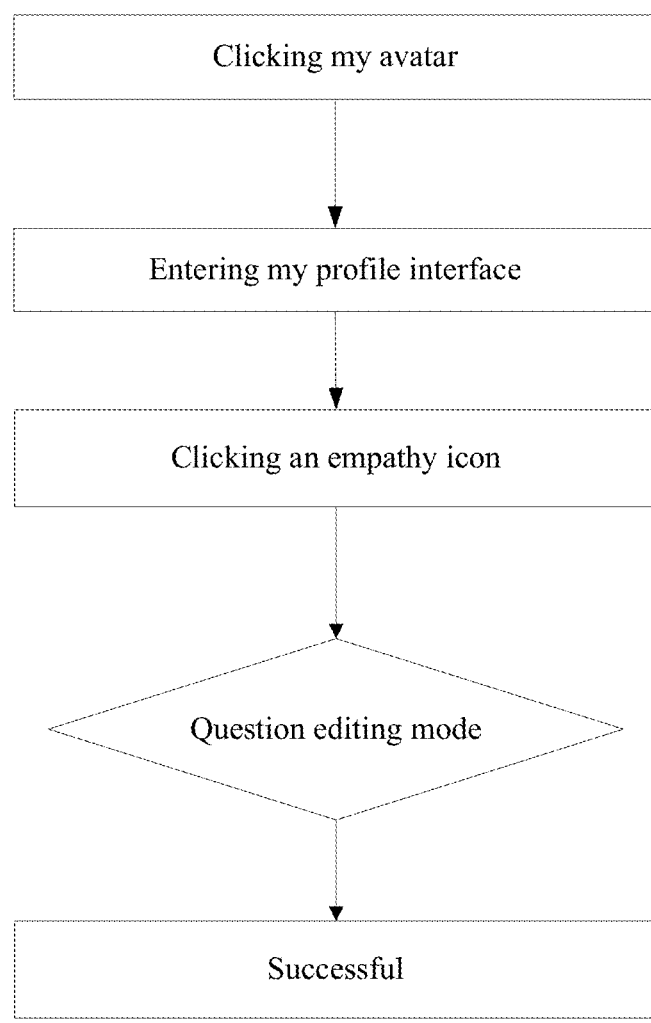
FIG. 3 is a flow chart of a step of setting a question and an answer in the method of the second embodiment.
Figure 4:
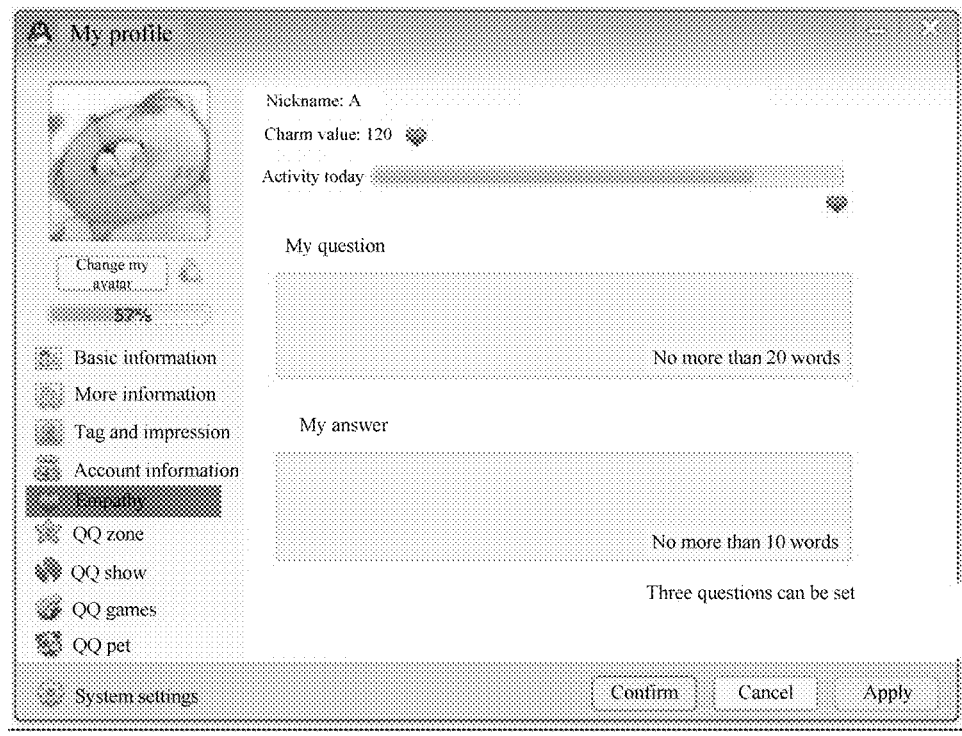
FIG. 4 is a schematic view of an interface for the step of setting a question and an answer in the method of the second embodiment.

In the embodiment, the second account is associated with the first account, for example, in the instant messaging software, the second account is one of the first account's good friends, for example, a user name of the first account is "A", a user name of the second account is "B", and B is in the buddy list of A. In use, a user of the second account opens a client side such as a smart phone, a notebook computer, and a tablet computer, and performs corresponding settings through the steps shown in FIG. 3, that is, click his or her avatar to enter a profile interface shown in FIG. 4. When the user clicks an empathy icon on the profile interface, he or she respectively inputs a question and a corresponding answer to input boxes 10 and 20, for example, the question is "what is my favorite animal?" and the corresponding answer is "cat". After the question and the answer are successfully set, the user clicks the "Confirm" button, thus, information including the particular question and the target answer to the particular question is sent to the server.

Step 202, encrypting and storing, by the client side, the information including the particular question and the target answer to the particular question.

In this step, the server encrypts and stores the information including the particular question and the target answer to the particular question, which avoids the leakage of the information.

Step 203, receiving, by the client side, an answer character string corresponding to the particular question input by a user via the first account.

Figure 5:
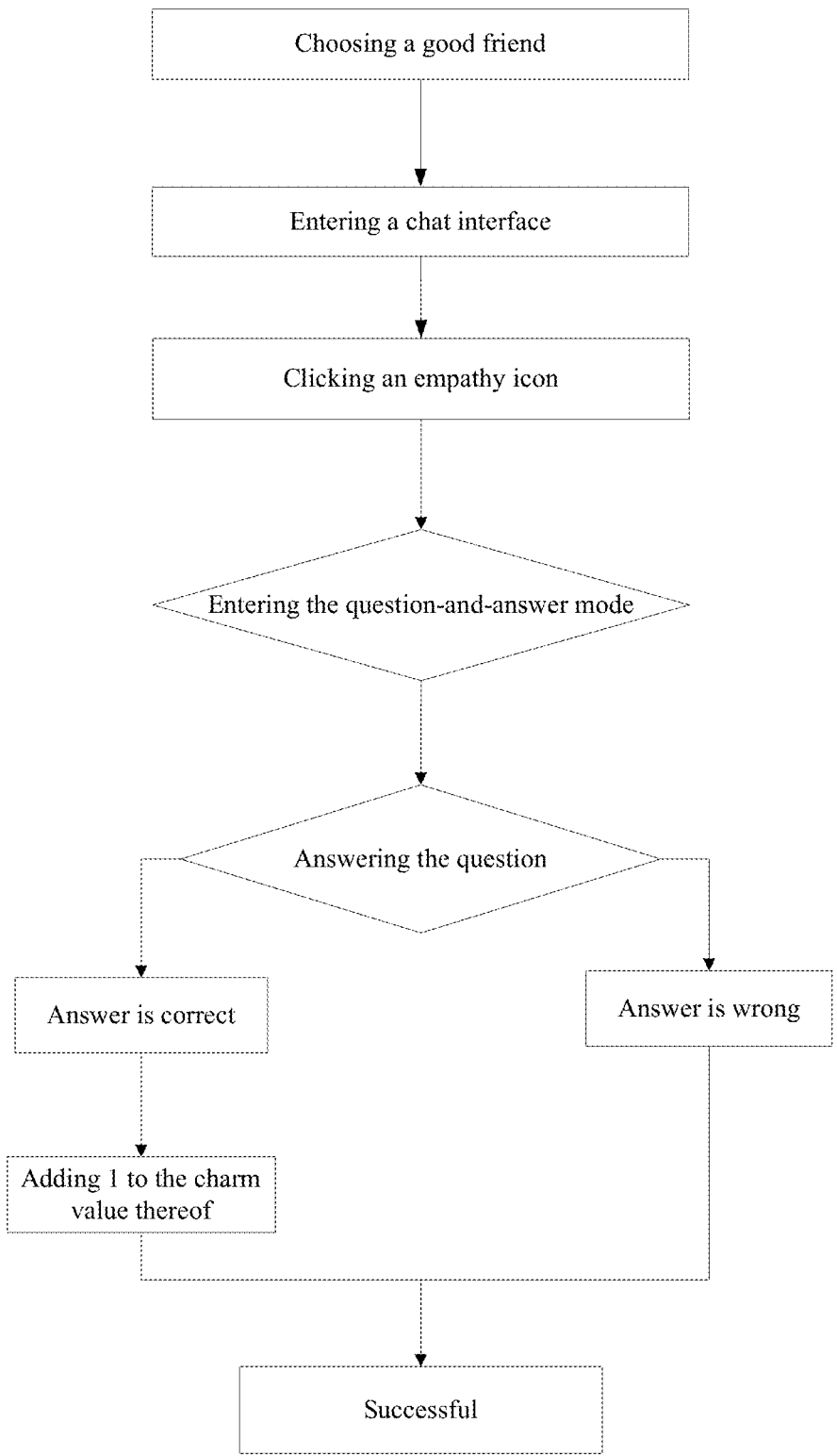
FIG. 5 is a flow chart of the step of answering the question in the method of the second embodiment.
Figure 6:
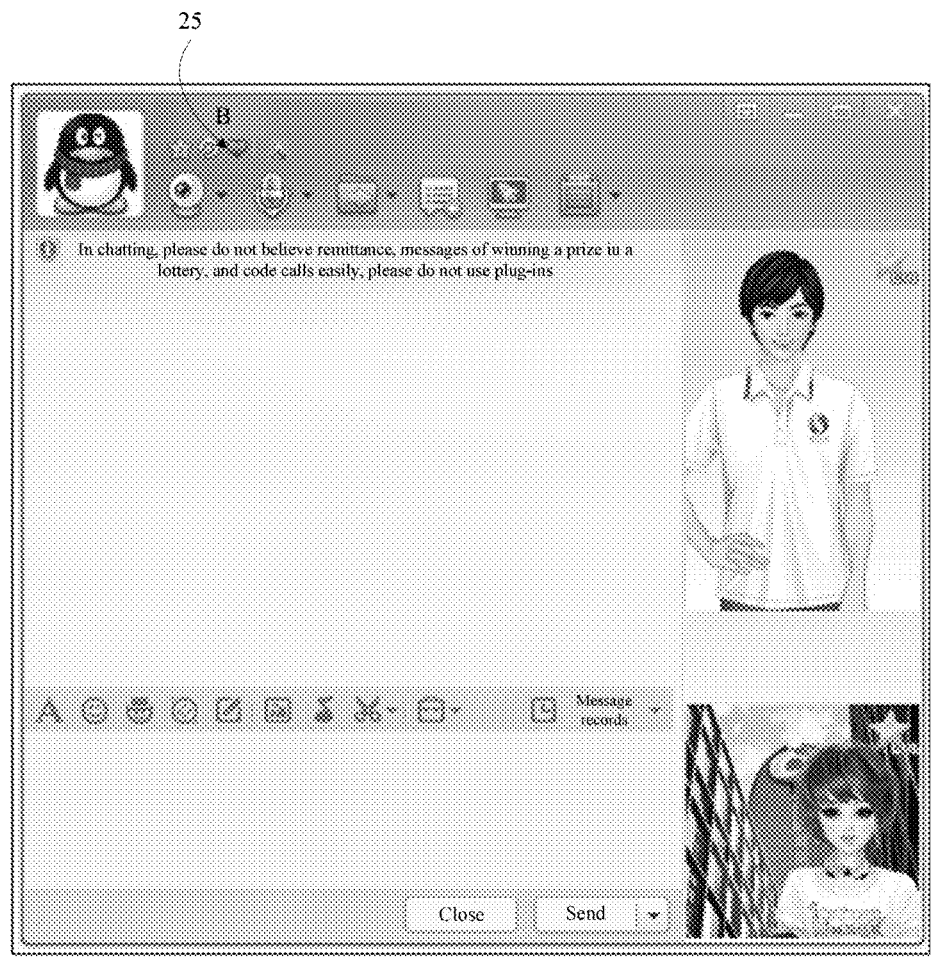
FIG. 6 is a schematic view showing an operation of starting a question-and-answer interface in the method of the second embodiment.
Figure 7:
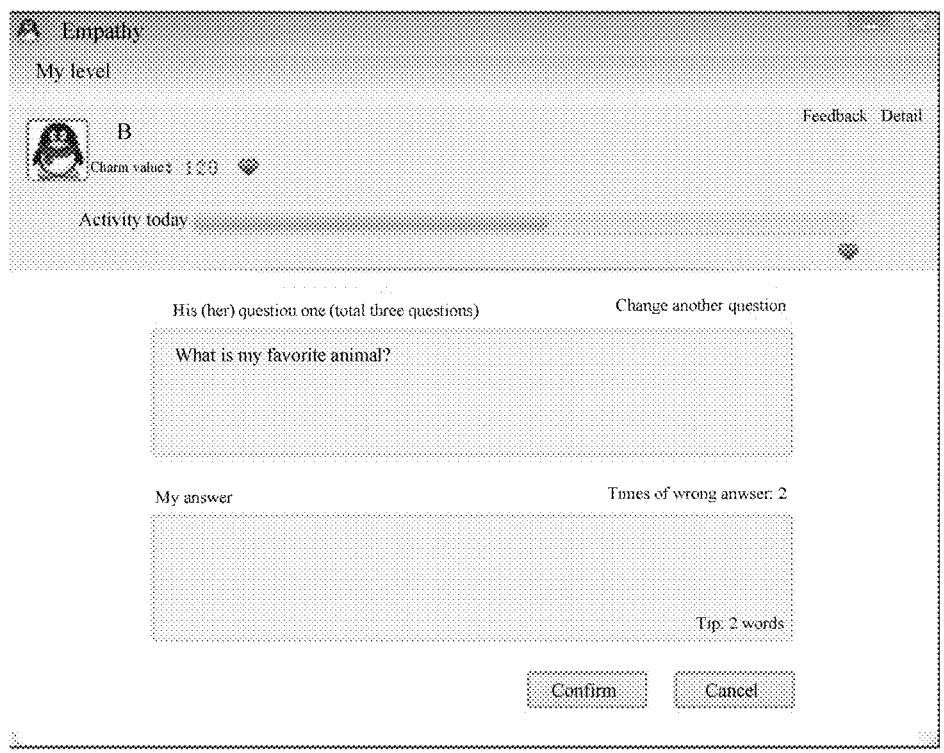
FIG. 7 is a schematic view of an interface for answering the question provided in the second embodiment.

Referring to FIGS. 5 and 6 together, A chooses B from the buddy list to enter a chatting interface, and then click the empathy icon 25 shown in FIG. 6 to enter a question-and-answer interface shown in FIG. 7. In the embodiment, supposed that A knows the answer to the question "what is my favorite animal" is "cat", then A inputs the character string "cat" in the box "my answer".

Step 204, searching, by the server, the particular question and the target answer to the particular question according to user property information, and matching and verifying, by the server, the input character string with the target answer.

When A clicks the "Confirm" button, the character string "cat" and the user property information are sent to the server through TCP/IP protocol. In the embodiment, the user property information includes the account of A, the account of B, or may further include the association information between A and B, that is, B is one of A's good friends.

When receiving the user property information, the server searches the particular question and the target answer to the particular question according to the user property information, and matches and verifies the answer character string with the preset target answer.

Step 205, when the verification is successful, returning, by the server, a first notice to the client side for displaying.

It could be understood that, if the character string input by A is not "cat", but a character string which does not match the answer of the question "what is my favorite animal" set by B, the verification fails. At this time, the server sends a second notice which indicates the failure of the verification to the client side of A. In other embodiments, other rules may be set, including setting a maximum number of wrong answers to be 3 and sending the second notice when B inputs the wrong answer three times, or changing the question to another one when B inputs the wrong answer, which is not limited herein.

Step 206, scoring, by the server, preset property of the first account based on a preset rule.

In the embodiment, the preset property of A may be a virtual charm value. When the verification is successful, an extra point is added to the virtual charm value of A.

In the embodiment, the virtual charm value of A is displayed by a visualized identification, as shown in FIG. 7, the virtual charm value of A is 120. In other embodiments, A may choose to send his or her virtual charm value to other friends, thereby improving interest of the interaction. It is to be noted that other users may look up the virtual charm value of A through the instant messaging software.

From the description in the above embodiment, the method of the second embodiment realizes the interaction by verifying the interaction question and adding an extra point to the virtual charm value, which effectively stimulates the question-and-answer interaction between instant messaging users and improves the effectiveness of the interaction.

Embodiment 3

Figure 8:
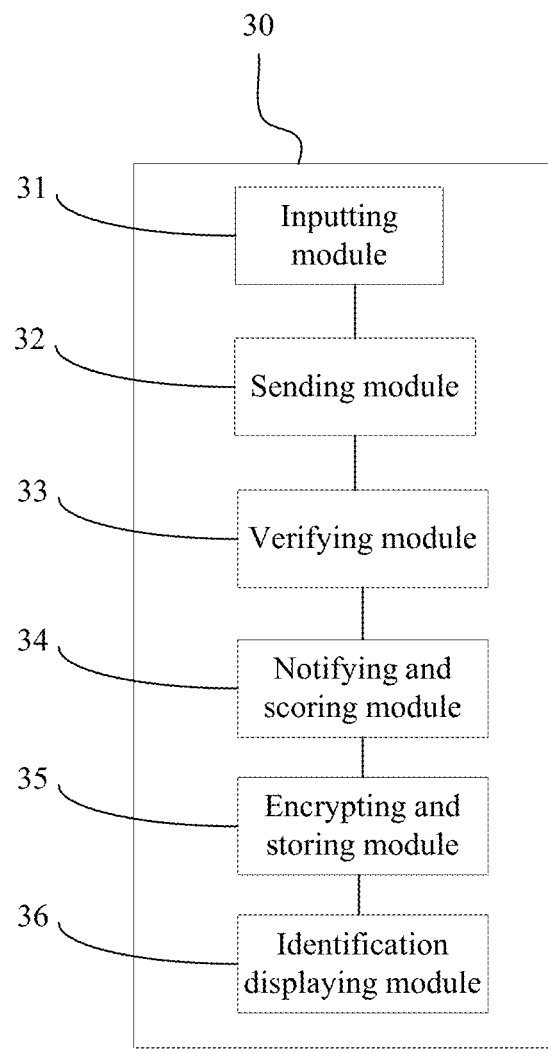
FIG. 8 is a schematic view of an instant messaging interaction system in accordance with a third embodiment of the present disclosure.

According to a third embodiment of the present disclosure, an instant messaging interaction system 30 is provided, as shown in FIG. 8, the system includes:

an inputting module 31, configured to receive an answer character string corresponding to a particular question input by a user via a first account;

a sending module 32, configured to send the answer character string and corresponding user property information to a server;

a verifying module 33, configured to search the particular question and a target answer to the particular question according to the user property information, and match and verify the answer character string with the target answer; and a notifying and scoring module 34, configured to return a first notice to a client side for displaying when the verification is successful, and score preset property of the first account based on a preset rule.

In the embodiment, the inputting module 31 is further configured to receive information including the particular question and the target answer to the particular question input by a user via a second account and send the information to the server, wherein the second account is associated with the first account. The instant messaging interaction system 30 further includes an encrypting and storing module 35 configured to encrypt and store the information including the particular question and the target answer to the particular question.

In addition, the notifying and scoring module 34 is further configured to return a second notice to the client side for displaying when the verification fails, and maintain a value of the preset property of the first account.

Furthermore, the instant messaging interaction module 30 further includes:

an identification displaying module 36, configured to display the value of the preset property of the first account by a visualized identification.

The instant messaging interaction system provided in the embodiment of the present disclosure stimulates the question-and-answer interaction between instant messaging users, thereby improving the effectiveness of the interaction.

Embodiment 4

Figure 9:
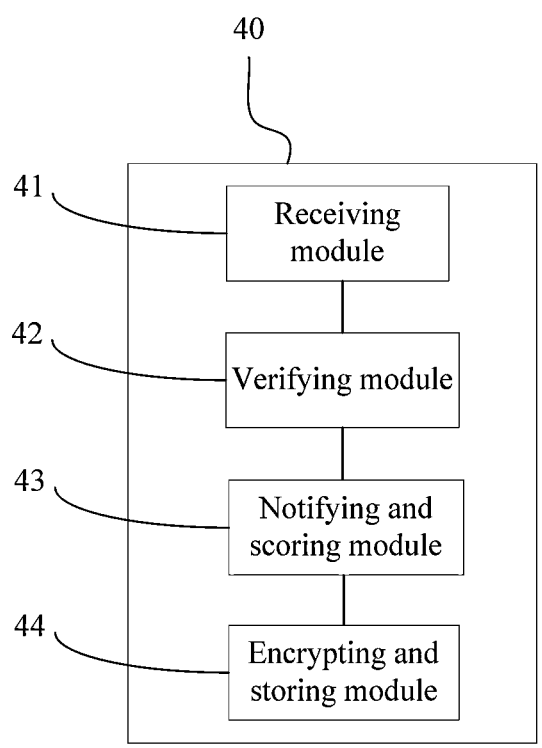
FIG. 9 is a schematic view of an instant messaging interaction server in accordance with a fourth embodiment of the present disclosure.

According to a fourth embodiment of the present disclosure, an instant messaging server 40 is provided, as shown in FIG. 9, the server includes:

a receiving module 41, configured to receive an answer character string corresponding to a particular question and corresponding user property information sent from a first account;

a verification module 42, configured to search the particular question and a target answer to the particular question according to the user property information, and match and verify the answer character string with the target answer; and a notifying and scoring module 43, configured to return a first notice to a client side for displaying, and score preset property of the first account based on a preset rule.

In the embodiment, the receiving module 41 is further configured to receive information including the particular question and the target answer to the particular question sent from a user via a second account, wherein the second account is associated with the first account. The server may further include an encrypting and storing module 44 configured to encrypt and storing the particular question and the target answer to the particular question.

In addition, the notifying and scoring module 43 is further configured to return a second notice to the client side for displaying when the verification fails, and maintain a value of the preset property of the first account.

The instant messaging server 40 provided in the embodiment of the present disclosure stimulates the question-and-answer interaction between instant messaging users, which increases the effectiveness of the interaction.

The system 30 of the third embodiment and the server 40 of the fourth embodiment are respectively similar to the conception and principle of the methods of the first and second embodiments, therefore, the parts of the third and fourth embodiments shared by the first and second embodiments are not described herein.

The present disclosure provides the technical solution for realizing the communication and interaction between new and old friends based on instant messaging software. With the technical solutions, users not only perform the communication based on ordinary text messages, but also use tiny pieces of times during chatting, thereby enhancing the interaction and communication and mutual understanding. In this way, the communication experience between users is enriched, and friends of the current user find common ground with the current user, which allows the current user to enjoy more enriched and convenient network chatting experience.

It will be appreciated by those having ordinary skill in the art that all the steps or at least some steps of the above embodiments may be realized by hardware or by instructing hardware by procedures, and all the procedures may be stored in a non-transitory computer readable storage medium which may be a read-only memory, a disc or an optical disc, etc.

The foregoing descriptions are only preferred embodiments of the present invention and are not intended to limit the present invention. Any modification, equivalent replacement and improvement made under the spirit and principle of the present invention should be included in the protection scope thereof.

What is claimed is:

1. An instant messaging interaction method, comprising:
   receiving in an instant messaging application, by a client side including a hardware processor and a display, information including a particular question and a target answer to the particular question input by a first user via a first account;
   receiving in the instant messaging application, by the client side, an answer character string corresponding to the particular question input by a second user via a second account;
   sending in the instant messaging application, by the client side, the answer character string and corresponding user property information to a server;
   searching, by the server, the particular question and the target answer to the particular question according to the user property information, and matching and verifying, by the server, the answer character string input by the second user with the target answer input by the first user;
   when the verification is successful, returning in the instant messaging application, by the server, a first notice to the client side for displaying, and scoring preset property of the second account based on a preset rule; and
   displaying on the display of the client side, a value of the preset property of the second account by a visualized identification, such that a question-and-answer interaction between the first user and the second user through the instant messaging application improves an effectiveness of user interaction.

2. The instant messaging interaction method of claim 1, wherein before receiving, by the client side, the answer character string corresponding to the particular question input by the second user via the second account, the method further comprises:

encrypting and storing, by the client side, the information including the particular question and the target answer to the particular question.

3. The instant messaging interaction method of claim 1, wherein when the verification fails, a second notice is returned to the client side for displaying and a value of the preset property of the second account is maintained.

4. An instant messaging interaction system, comprising:
a memory;
a hardware processor coupled to the memory;
a displaying unit; and
a plurality of program modules stored in the memory to be executed by the processor, the plurality of program modules comprising:
an inputting module, configured to receive information including a particular question and a target answer to the particular question input by a first user via a first account in an instant messaging application, and configured to receive an answer character string corresponding to the particular question input by a second user via a second account in the instant messaging application;
a sending module, configured to send the answer character string and corresponding user property information to a server;
a verifying module, configured to search the particular question and the target answer to the particular question according to the user property information, and match and verify the answer character string input by the second user with the target answer input by the first user; and
a notifying and scoring module, configured to return a first notice to a client side for displaying in the instant messaging application and score preset property of the second account based a preset rule when the verification fails;
wherein the displaying unit is configured to display the value of the preset property of the second account by a visualized identification, such that a question-and-answer interaction between the first user and the second user through the instant messaging application improves an effectiveness of user interaction.

5. The instant messaging interaction system of claim 4, further comprises:

an encrypting and storing module configured to encrypt and store the information including the particular question and the target answer to the particular question.

6. The instant messaging interaction system of claim 4, wherein the notifying and scoring module is further configured to return a second notice to the client side for displaying and maintain a value of preset property of the second account when the verification fails.

7. An instant messaging server, comprising:
a memory;
a hardware processor coupled to the memory; and
a plurality of program modules stored in the memory to be executed by the processor, the plurality of program modules comprising:
a receiving module, configured to receive information including a particular question and a target answer to the particular question sent from a first account in an instant messaging application, and configured to receive an answer character string corresponding to the particular question and corresponding user property information sent from a second account in the instant messaging application;
a verifying module, configured to search the particular question and the target answer to the particular question according to the user property information, and match and verify the answer character string from the second account with the target answer from the first account; and
a notifying and scoring module, configured to return a first notice to a client side for displaying in the instant messaging application when the verification is successful, and score preset property of the second account based on a preset rule; wherein the preset property of the second account is displayed on a display of the client side by a visualized identification, such that a question-and-answer interaction between the first user and the second user through the instant messaging application improves an effectiveness of user interaction.

8. The instant messaging server of claim 7, further comprises an encrypting and sorting module configured to encrypt and store the information including the particular question and the target answer to the particular question.

9. The instant messaging server of claim 7, wherein the notifying and scoring module is further configured to return a second notice to the client side for displaying and maintain a value of the preset property of the second account when the verification fails.

* * * * *